United States Patent
Pasqualon

(10) Patent No.: US 10,240,487 B2
(45) Date of Patent: Mar. 26, 2019

(54) METHOD FOR STARTUP AND MANAGEMENT OF A COMBINED CYCLE HEATING SYSTEM FOR THE PRODUCTION OF POWER

(75) Inventor: Ezio Pasqualon, Sittard (NL)

(73) Assignee: STAMICARBON B.V., Sittard (NL)

( * ) Notice: Subject to any disclaimer, the term of this patent is extended or adjusted under 35 U.S.C. 154(b) by 1018 days.

(21) Appl. No.: 13/976,917

(22) PCT Filed: Dec. 30, 2011

(86) PCT No.: PCT/IB2011/056026
§ 371 (c)(1),
(2), (4) Date: Sep. 13, 2013

(87) PCT Pub. No.: WO2012/090182
PCT Pub. Date: Jul. 5, 2012

(65) Prior Publication Data
US 2014/0000277 A1   Jan. 2, 2014

(30) Foreign Application Priority Data

Dec. 30, 2010 (IT) .............................. MI2010A2463
Dec. 31, 2010 (IT) .............................. MI2010A2481

(51) Int. Cl.
*F01K 23/10* (2006.01)
*F01K 13/02* (2006.01)
(Continued)

(52) U.S. Cl.
CPC .............. *F01K 13/02* (2013.01); *F01D 19/00* (2013.01); *F01K 3/22* (2013.01); *F01K 23/10* (2013.01); *F01K 23/101* (2013.01); *F01K 23/14* (2013.01); *F01K 23/16* (2013.01); *F02C 6/00* (2013.01); *F02C 7/26* (2013.01); *F02C 9/00* (2013.01); *F22B 1/1815* (2013.01); *Y02E 20/16* (2013.01)

(58) Field of Classification Search
CPC . F01K 13/02; F01K 3/22; F01K 23/10; F01K 23/101; F01K 23/106; F01K 23/108; F01D 19/00; F01D 19/02; F22B 25/14; F22B 1/1815; F02C 7/264–7/277; F02C 6/18; F02C 7/26; F05D 2220/72; F05D 2260/85; Y02E 20/16
See application file for complete search history.

(56) References Cited

U.S. PATENT DOCUMENTS 2,285,208 A * 6/1942 Johntz .................... F01D 19/00
290/40 R
3,532,079 A * 10/1970 Chambert ............... F22B 35/14
122/406.5
(Continued)

OTHER PUBLICATIONS

K. Nakanomori and M. Kano, On the Automatic Start-Up/Shutdown System for a Combined Cycle With Two Different Gas Turbines, 1992, IFAC Control of Power Plants and Power Systems, Munich, Germany, pp. 63-68.*
(Continued)

*Primary Examiner* — Gerald L Sung
*Assistant Examiner* — Marc Amar
(74) *Attorney, Agent, or Firm* — Morrison & Foerster LLP

(57) ABSTRACT

A method to start up and manage a combined cycle thermal plant for energy production comprising the execution according to a set sequence of a plurality of functional groups.

9 Claims, 1 Drawing Sheet

(51) Int. Cl.
*F01K 3/22* (2006.01)
*F01D 19/00* (2006.01)
*F22B 1/18* (2006.01)
*F02C 7/26* (2006.01)
*F01K 23/14* (2006.01)
*F01K 23/16* (2006.01)
*F02C 6/00* (2006.01)
*F02C 9/00* (2006.01)

(56) References Cited

U.S. PATENT DOCUMENTS

| | | | | |
|---|---|---|---|---|
| 3,879,616 A * | 4/1975 | Baker | ............... | F01K 13/02 |
| | | | | 290/2 |
| 4,015,548 A * | 4/1977 | Schuss | ............... | F23N 1/082 |
| | | | | 110/101 C |
| 4,028,884 A * | 6/1977 | Martz | ............... | F01K 23/108 |
| | | | | 60/39.182 |
| 4,167,096 A * | 9/1979 | Smith | ............... | F01K 23/105 |
| | | | | 60/39.281 |
| 4,201,923 A * | 5/1980 | Reed | ............... | F01K 23/105 |
| | | | | 290/40 R |
| 4,282,708 A * | 8/1981 | Kuribayashi | ............... | F01K 23/10 |
| | | | | 60/39.182 |
| 4,493,186 A * | 1/1985 | Emsperger | ............... | F22G 5/00 |
| | | | | 122/1 R |
| 5,042,246 A * | 8/1991 | Moore | ............... | F01D 19/00 |
| | | | | 60/39.182 |
| 5,471,832 A * | 12/1995 | Sugita | ............... | F01K 23/108 |
| | | | | 60/39.182 |
| 5,649,416 A | 7/1997 | Moore | | |
| 6,178,734 B1 * | 1/2001 | Shibuya | ............... | F01K 23/106 |
| | | | | 60/39.182 |
| 6,691,531 B1 * | 2/2004 | Martinez | ............... | F25J 1/0282 |
| | | | | 62/612 |
| 7,421,854 B2 * | 9/2008 | Shaffer | ............... | F04D 27/0246 |
| | | | | 60/239 |
| 8,195,339 B2 * | 6/2012 | Long | ............... | G05B 17/02 |
| | | | | 60/646 |
| 8,739,509 B2 * | 6/2014 | Asanaka | ............... | F01K 13/02 |
| | | | | 60/39.182 |
| 9,140,192 B2 * | 9/2015 | Ehrsam | ............... | F01D 19/00 |
| 9,354,141 B1 * | 5/2016 | McElrath | ............... | G01M 15/14 |
| 2005/0034445 A1 * | 2/2005 | Radovich | ............... | F01K 13/02 |
| | | | | 60/39.182 |
| 2005/0160750 A1 * | 7/2005 | Shaffer | ............... | F04D 27/0246 |
| | | | | 62/228.1 |
| 2005/0172633 A1 * | 8/2005 | Cooper | ............... | F01K 23/101 |
| | | | | 60/772 |
| 2007/0169485 A1 * | 7/2007 | Bellows | ............... | F01K 23/106 |
| | | | | 60/772 |
| 2008/0190382 A1 * | 8/2008 | Bruckner | ............... | F22B 37/26 |
| | | | | 122/7 R |
| 2009/0145104 A1 | 6/2009 | Alexander et al. | | |
| 2009/0217665 A1 | 9/2009 | Holzhauer et al. | | |
| 2009/0292436 A1 * | 11/2009 | D'Amato | ............... | G05B 13/048 |
| | | | | 701/100 |
| 2012/0283988 A1 * | 11/2012 | Pandey | ............... | G06Q 30/06 |
| | | | | 702/179 |
| 2012/0317973 A1 * | 12/2012 | Gulen | ............... | F01K 23/065 |
| | | | | 60/597 |

OTHER PUBLICATIONS

International Search Report for PCT/IB2011/056026, dated Apr. 16, 2012, 4 pages.

* cited by examiner

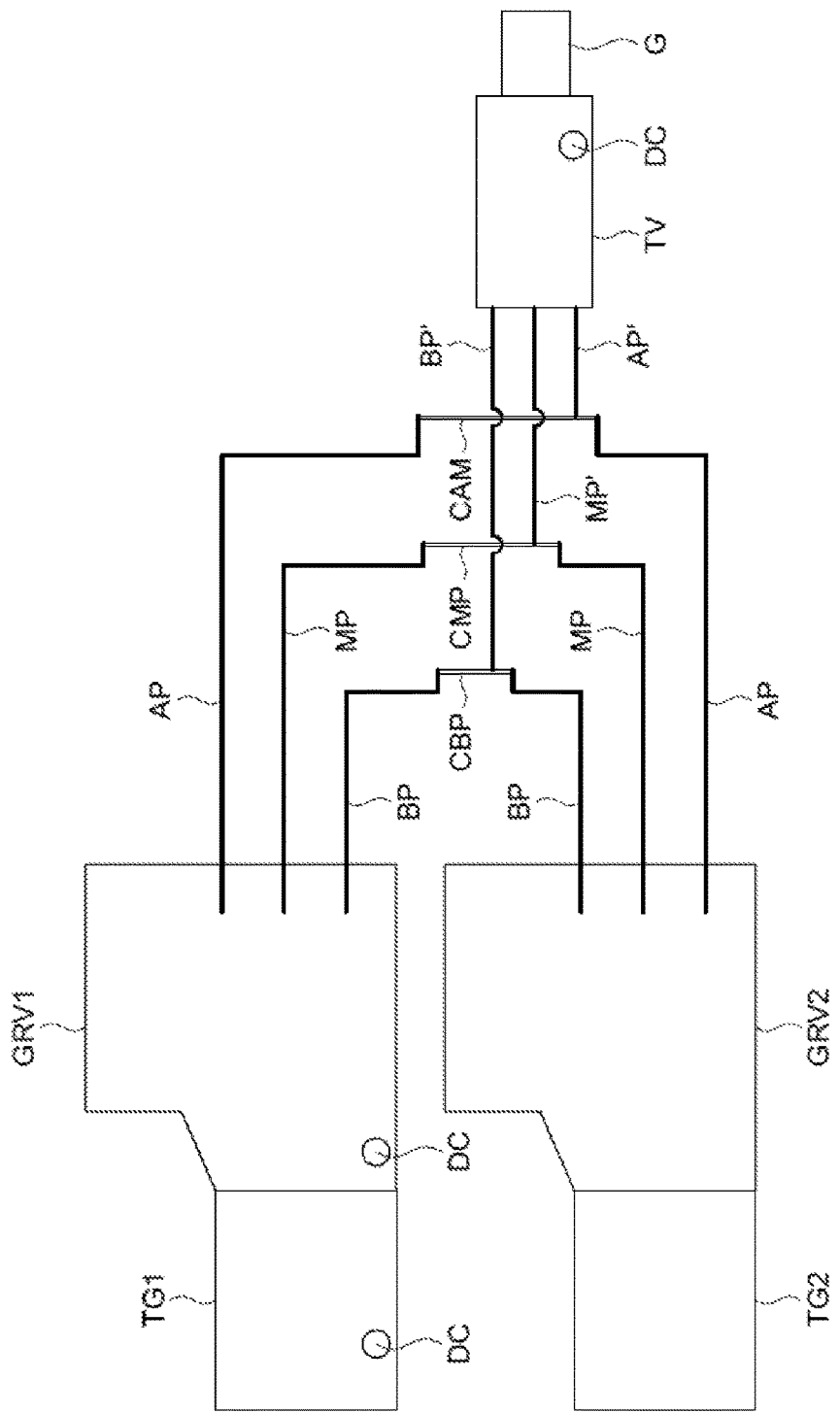

METHOD FOR STARTUP AND MANAGEMENT OF A COMBINED CYCLE HEATING SYSTEM FOR THE PRODUCTION OF POWER

FIELD OF THE INVENTION

This invention refers to a method for startup and management of a combined cycle heating system for the production of electric power.

BACKGROUND TO THE INVENTION

In the scope of this invention, "functional unit" and other similar expressions are used to indicate a clearly predefined sequence of sequential operations executed automatically and linked to one another; in short, these expressions are used to indicate a macro instruction composed of several minor instructions linked to one another from a standpoint of time and function.

Furthermore, in the scope of this invention, the term "bottling" in reference to a heat recovery steam generator is used to indicate the total of a series of activities designed to isolate the same steam generator and the peak heating cycle from the external environment and other components of the system as much as possible, in order to retain all of the accumulated heat within the generator as long as possible. The bottling operation is executed by implementing opportune actions on the system's insulation systems (valves, dampers, etc.).

The electric power production systems described above, also noted as combined cycle systems in relation to the fact that these systems require a recovered heat steam cycle subordinate to a preliminary cycle to generate electric power through the implementation of one or more gas turbine and generator units, are quite common at present due to their extreme flexibility of use which allows variations in the quantity of produced power within an extended range of percentages in reasonable time limits, while maintaining good overall yield when the system reaches the fully operational phase.

Moreover, the combined cycle heating system for the production of electric power can also be stopped and restarted within reduced time intervals.

For combined cycle heating systems for the production of electric power, the transitory phase, which comprises the stages in which the system changes functioning modes, is very critical. Examples of possible transitory stages in the functioning of the system are as follows:

during the startup phase from a stopped system through startup of a single gas turbine and generator unit and subsequent ground running and loading of the steam turbine (TV);

during the startup phase of the second gas turbine and generator unit with the first gas turbine and generator unit already running, as well as the steam turbine;

during the complete stopping of the system starting from an initial condition in which only one gas turbine and generator unit is operating or during the stopping of a gas turbine and generator unit from an initial condition in which two gas turbine and generator units are operating.

It is almost superfluous to explain how the aforementioned transitory stages of system operations are critical from the following points of view:

1) from the structural stress that the various system components are subjected to (for example, due to the heavy-duty operating conditions or the temperature fluctuations in the range of several hundreds of degrees absorbed within only a few hours) and 2) the decisional randomness and discretionality left to the operator when startup is carried out as a sequence of manual operations as opposed to automated operations In addition, the transitory stages are penalized from the standpoint of comprehensive efficiency of the system, in particular as pertains to the startup phases.

Furthermore, it is also evident that during the transitory stages of the system startup from an initial condition with the system completely stopped there is an increase in polluting atmospheric emissions.

As described above, it is evidently necessary to operate the system through startup sequences and stopping procedures which:

are as optimized as possible, in order to reduce the mechanical and thermal stress on the components, allow reduction to a minimum of the duration of the transitory stages without excessively penalizing the comprehensive yield of the system and allow reduction to a minimum of potential errors, limiting the discretional component of the operator as much as possible.

Since for each system component, such as, for example, the gas turbine and generator unit, the steam generator or the steam turbine must follow a specific functional unit, and it should be noted that a clearly determined sequence of subsequent operations, from startup to stopping, provided by the manufacturer of the same component in order to address the aforementioned requirement, creates the problem of how to correctly link the functional units of the various components of the system to obtain a harmonious startup and stopping procedure that takes the system from an initial condition of, for example, a stopped system, to a secondary condition of, for example, a running system.

Currently, the aforementioned harmonious procedure for executing the correct sequence of functional units is the responsibility of the plant technicians, who start from a written sequence of the functional units specifically arranged for the system and follow the procedure. In this regard, it is appropriate to highlight the fact that even though this is correct from a chaining standpoint, the sequence of the functional units is executed according to timing on a case-by-case basis established by the plant technician, who based on personal gained experience evaluates the specific physical and functional parameters of the system, and decides based on personal experience which operations to carry out for commissioning the various components required for startup.

This procedural method is not satisfactory because it constantly requires the presence of plant technicians who have acquired long-term experience with the specific plant to start/stop the equipment, which inevitably leads to conflict due to the fact that different technicians will implement different startup times, and even though they may be correct, this does not permit constant optimization of the procedure while at the same time satisfying this requirement.

SUMMARY OF THE INVENTION

The basic problem at the core of this invention is how to engineer and fine-tune a method that allows optimization of the startup and/or stopping sequences, partially or totally, for combined cycle heating systems for the production of electric power once the functional units are specified, or, rather, optimization of the specific operations to be carried out to startup or stop the specific components of the system.

This problem is resolved by a method for startup and management of a combined cycle heating system for the production of electric power.

Secondarily, this problem is also resolved by a combined cycle heating system for the production of electric power by the aforementioned method.

BRIEF DESCRIPTION OF THE DRAWINGS

FIG. 1 represents a diagram view of a combine cycle heating system for the production of electric power with implementation of the method according to the invention.

DETAILED DESCRIPTION OF THE INVENTION

Further characteristics and advantages of the method according to the invention and the system based on the invention are described as follows with preferred implementation, by way of non-limiting examples, with reference to FIG. 1, which represents a diagram view of a combine cycle heating system for the production of electric power with implementation of the method according to the invention.

In accordance with the illustrations, the heating system for the production of electric power is composed of:
 a first gas turbine and generator unit TG1;
 a first heat recovery steam generator GRV1 to recover the latent heat in the exhaust from the first gas turbine and generator TG1;
 a second gas turbine and generator unit TG2;
 a second heat recovery steam generator GRV2 to recover the latent heat in the exhaust from the first gas turbine and generator unit TG2;
 a steam turbine (TV) with high pressure stages, medium pressure stages and low pressure stages in fluid communication with the first GRV1 steam generator through the high pressure steam lines, the medium pressure steam lines and, respectively, the low pressure steam lines;
 a high pressure steam collector (CAP), a medium pressure steam collector (CMP), and a low pressure steam collector (CBP) to create steam parallelism at high pressure, medium pressure and, respectively, low pressure between the first steam generator (GRV1) and the second steam generator (GRV2), the high pressure steam collector (CAP), the medium pressure steam collector (CMP), and the low pressure steam collector (CBP), respectively, in fluid communication with the high pressure steam lines, the medium pressure steam lines and the low pressure steam lines through which the different steam turbine (TV) stages are powered and
 a generator coupled with the steam turbine.

Each of the first and second generators, in some instances, are cylindrical body generators with horizontal development with three different levels of pressure and a degasification device is included.

The system, according to the invention, also includes valves and similar devices which can be opened and closed to adjust system operation. These valves are not represented in the FIGURE diagram and are not described in detail since they are components with which the specialized technician is already familiar.

Furthermore, the system according to the invention includes detection and control devices (DC) to detect and monitor several parameters correlated with correct functioning and/or malfunctioning of the system, in particular the first and second gas turbine and generator units TG1 and TG2, the first and second steam generators GRV1 and GRV2 and the steam turbine TV.

Favorably, the system according to the invention includes a control and DCS processing unit (not illustrated in the FIGURE to render the representation as simple as possible) which memorizes:
 the single sequences of the functional units necessary for startup/stopping of the various parts of the system starting from stopping and/or functioning conditions, total or partial, of the system and
 the different system conditions that must be detected using detection and control devices to consent to the execution of the functional units still to be implemented.

Favorably, the control and processing unit is connected to the aforementioned detection and control devices to:
 acquire and process information relative to the functioning and/or malfunctioning status of the various system components;
 following a request for a specific startup/stopping sequence from the memorized startup/stopping sequences, automatically and in sequence start the functional units of the specifically requested sequence, subordinate to detection by the detection devices of the necessary different system conditions, which must be verified to allow startup of each functional unit, checking the correct completion of each functional unit which is started.

As described above, the control and processing unit memorizes the single functional units, as well as the sequences of the functional units; in other words, several functional units linked to one another according to a preset and optimized sequence, corresponding to the various different startup and stopping procedures, total or partial, for the system according to the invention. At the same time, the aforementioned control and processing unit also memorizes the specific and different local conditions in the various system components and in the remaining parts of the system, which must be identified to consent execution of the functional units still to be executed. This takes place thanks to the fact that the control and processing unit continuously detects the specific and different local conditions in the various system components and in the remaining parts of the system and compares these with the reference values (the suitable values for providing consent), and if the values correspond it allows automatic startup of the subsequent functional units in the required specific startup/stopping sequence.

In short, the system's control and processing unit permits automatic chained execution of the various functional units required for the sequence composed thanks to systematic automatic verification designed to provide consent for execution of a specific functional unit as soon as the detected values communicated to the control and processing unit satisfy the requirements memorized in the control and processing unit for execution of the functional units which still must be executed.

Therefore, in the system according to the invention, the linking of the various functional units necessary for system startup or stopping sequence, total or partial, no longer relies on the experience and discretion of the system operator, but is instead guaranteed to be optimum and repeatable through the system control and processing unit.

The following section describes some examples of implementation of the method according to the invention relative to some sequences of functional units necessary for a first operative configuration and a second operative configuration.

A) Startup of a First Gas Turbine and Generator Unit TG1 and Steam Turbine TV from Stopped Condition The startup phases of a first gas turbine and generator unit TG1 and the steam turbine TV of the system include the following sequence of functional units:

GF1A: Prepare startup of the aforementioned first gas turbine and generator unit TG1;

GF2A: Startup of the aforementioned first gas turbine and generator unit TG1 and pressurization of first steam generator GRV1;

GF3A: Ground running and loading of the aforementioned steam turbine TV after startup of the first gas turbine and generator unit TG1 with suction at condenser present.

In the system according to the invention, this startup sequence is characterized by the fact that it is composed of the following phases in order:

through the use of the aforementioned detection and control
device verification of the effective completion of functional unit GF1A (preparation of the first gas turbine and generator TG1 for startup) and, subordinate to verification of this condition, determination of automatic startup of the sequence for the aforementioned functional unit GF2A, which determines startup of the first gas turbine and generator unit TG1 and the pressurization of the first steam generator GRV1, as well as through the use of the aforementioned detection and control
device verification of the effective completion of functional unit GF2A (startup of first gas turbine and generator unit TG1 and pressurization of the first steam generator GRV1) and, subordinate to verification of this condition, determination of automatic startup of the functional unit GF3A, which determines ground running and loading of the steam turbine TV.

B) Startup of a Second Gas Turbine and Generator Unit TG2 with First Gas Turbine and Generator TG1 and Steam Turbine TV Already Running The startup phases for a second gas turbine and generator unit TG2 while the first gas turbine and generator unit TG1 and the steam turbine TV are already running include the following sequence of functional units in order:

GF4A: Prepare the aforementioned second gas turbine and generator unit TG2 for startup;

GF5A: Startup of the aforementioned second gas turbine and generator unit TG2 and pressurization of the aforementioned steam generator GRV2 and GF6A: Parallel insertion of steam between the aforementioned second steam generator GRV2 and the aforementioned first steam generator GRV1 through high pressure steam collectors CAP, medium pressure steam collectors CMP, and low pressure steam collectors CBP that supply, respectively, the high pressure stages, medium pressure stages and low pressure stages of the aforementioned steam turbine TV.

In the system according to the invention, this startup sequence is characterized by the fact that it is composed of the following phases in order:

through the use of the aforementioned detection and control
device verification of the effective obtainment of the system conditions obtained following the correct execution of the functional unit GF1A (preparation of the aforementioned first gas turbine and generator unit TG1 for startup) and, subordinate to verification of this condition, determination of automatic startup of the functional unit GF4A, which prepares the second gas turbine and generator unit TG2 for startup;

through the use of the aforementioned detection and control
device verification of effective obtainment of the system conditions obtained following the correct execution of the aforementioned functional unit GF5A (ground running and loading of the steam turbine TV following startup of the first gas turbine and generator unit TG1) and, subordinate to verification of this condition, determination of automatic startup of the functional unit GF5A, which determines startup of the second gas turbine and generator unit TG2 and pressurization of the second steam generator GRV2, as well as through the use of the aforementioned detection and control
device verification of the effective obtainment of the system conditions obtained following the correct execution of the functional unit GF5A (startup of the second gas turbine and generator unit TG2 and pressurization of second steam generator GRV2) and, subordinate to verification of this condition, determination of automatic startup of the sequence for the aforementioned functional unit GF6A, which establishes parallel steam between the second steam generator (GRV2) and the first steam generator (GRV1).

C) Stopping the Second Gas Turbine and Generator Unit (TG2) with the First Gas Turbine and Generator Unit (TG1) and Steam Turbine (TV) Running The stopping phases of the second gas turbine and generator unit TG2 and the second steam turbine GRV2 while the first gas turbine and generator unit TG1 and steam turbine TV are running include the following sequence of functional units in order:

GF4B: Interruption of the parallel steam between the second steam generator
GRV2 and the steam from the first steam generator GRV1 and
GF3B: Stopping of the second gas turbine and generator unit TG2.

In the system according to the invention, this stopping sequence is characterized by the fact that it is composed of the following phases in order:

through the use of the aforementioned detection and control
device verification of the effective obtainment of the system conditions obtained following the correct execution of the functional unit GF4B (interruption of parallel steam between the second steam generator (GRV2) and the first steam generator (GRV1) and, subordinate to verification of this condition, determination of automatic startup of the stopping sequence for the aforementioned functional unit GF3B to stop the second gas turbine and generator unit TG2.

Preferably, the aforementioned functional unit GF3B (stopping of the second gas turbine and generator unit TG2) also includes simultaneous bottling of the second steam generator GRV2 in order to maintain the temperature pressure of the steam within the generator as long as possible.

D) Complete Stopping of the System Starting from a Condition with Only the First Gas Turbine and Generator Unit (TG1) and the Steam Turbine (TV) Running The phases for complete stopping of the system starting from a condition with only the first gas turbine and generator unit (TG1) and the steam turbine (TV) running include the following sequence of functional units in order:

GF2B: Reduction of load in the first gas turbine and generator unit TG1 and blocking of the steam turbine TV and GF1B: Stopping of the first gas turbine and generator unit TG1.

In the system according to the invention, this stopping sequence is characterized by the fact that it is composed of the following phases in order:

through the use of the aforementioned detection and control device verification of the effective completion of the aforementioned functional unit GF2B (reduction of load in the first gas turbine and generator unit TG1 and blocking of the steam generator TV) and, subordinate to verification of this condition, determination of automatic startup of the stopping sequence for the aforementioned functional unit GF1B to stop the first gas turbine and generator unit TG1.

Preferably, the aforementioned functional unit GF1B (stopping of the first gas turbine and generator unit TG1) also includes simultaneous bottling of the first steam generator GRV1 in order to maintain the temperature pressure of the steam within the generator as long as possible.

As evident in the descriptions, the method according to the invention, as well as the system according to the invention, satisfy the aforementioned requirement of simultaneously resolving the problems presented in the introduction of the description with reference to the technician. In fact, as described above, the linkage of the various functional units necessary to compose a startup or stopping sequence, partial or total, of the system, no longer relies on the experience and discretion of the system operator, but is instead guaranteed to be optimum and repeatable through the system control and processing unit.

Obviously, a specialized technician, for the purpose of satisfying specific requirements, may implement numerous modifications and variations to the system and method described above, all of which are covered in the scope of protection of the invention as defined in the following claims.

What is claimed is:

1. A method to start up and manage a combined cycle thermal plant for energy production comprising a first gas turbine and generator group (TG1), a first steam generator (GRV1), a multistage steam turbine (TV) and a separate generator coupled to said steam turbine (TV) wherein:

said first steam generator (GRV1) is a recovery steam generator to utilize the latent heat of the exhaust gases of said first gas turbine and generator group (TG1);

said first steam generator (GRV1) is in fluid communication through steam lines at high, medium and low pressure with corresponding stages at high, medium and low pressure of said steam turbine (TV) and said separate generator is kinematically coupled to said steam turbine to be rotationally operated; and said method comprising monitoring and detecting a plurality of parameters that determine correct functioning and/or malfunctioning of said first gas turbine and generator group (TG1), of said first steam generator (GRV1) and of said steam turbine (TV), and wherein the method further comprises starting up the plant from an off-state which starting up comprises, in order, the following sequential operations:

Operation GF1A: preparing said first gas turbine and generator group (TG1) for start up;

Operation GF2A: starting said first gas turbine and generator group (TG1) and pressurizing said first steam generator (GRV1);

Operation GF3A: warming up and increasing the load of said steam turbine (TV) following starting said first gas turbine and generator group (TG1);

wherein said method further comprises:

verifying completion of said operation GF1A and, subordinate to the completion of said operation GF1A automatically implementing operation GF2A and verifying completion of said operation GF2A and, subordinate to completion of operation GF2A automatically implementing operation GF3A so that the starting up is automatically carried out.

2. The method of claim 1, wherein said combined cycle thermal plant for energy production further comprises:

a second gas turbine and generator group (TG2), a second recovery steam generator (GRV2) to utilize the latent heat of the exhaust gases of said second gas turbine and generator group (TG2);

said second steam generator (GRV2) being in fluid communication through a high pressure steam collector (CAP), through a medium pressure steam collector (CMP) and through a low pressure steam collector (CBP) with said high, medium and low pressure steam lines of said first steam generator (GRV1) to feed said high, medium and low pressure stages of said steam turbine (TV) through a steam parallelism at high, medium and low pressure between said first steam generator (GRV1) and said second steam generator (GRV2), and wherein said method comprises detecting and monitoring a plurality of parameters that determine correct functioning and/or malfunctioning of said second gas turbine and generator group (TG2) and of said second steam generator (GRV2), wherein the method further comprises starting up said second gas turbine and generator group (TG2) which starting up comprises, in order, the following sequential operations:

Operation GF4A: preparing said second gas turbine and generator group (TG2) for start up;

Operation GF5A: starting said second gas turbine and generator group (TG2) and pressurizing said second steam generator (GRV2) and Operation GF6A: inserting a steam parallelism between said second steam generator (GRV2) and said first steam generator (GRV1) through said steam collectors at high (CAP), medium (CMP) and low (CBP) pressure respectively feeding said high, medium and low pressure stages of said steam turbine (TV), wherein said method further comprises:

verifying achievement of correct execution of said operation GF1A and, subordinate to said achievement effecting automatic implementation of said operation GF4A;

verifying achievement of operation GF3A and, subordinate to the achievement said operation GF3A automatically effecting operation GF5A and checking the completion of said operation GF5A and, subordinate to the completion of operation GF5A automatically effecting operation GF6A, so that the starting up of said second gas turbine and generator group (TG2) is automatically carried out.

3. The method of claim 2, which further includes a stop phase of said second gas turbine and generator group (TG2)

and of said second steam generator (GRV2) that comprises, in order, the following sequential operations:

Operation GF4B: interrupting the steam parallelism between said second steam generator (GRV2) and said first generator (GRV1) and Operation GF3B: stopping said second gas turbine and generator group (TG2)

wherein said method comprises:
verifying completion of said operation GF4B and, subordinate to the completion of operation GF4B automatically carrying out operation GF3B,
so that the stop phase of said second gas turbine and generator group (TG2) is automatically carried out.

4. The method of claim 3, wherein said operation GF3B comprises a simultaneous bottling of said second steam generator (GRV2) to keep steam pressure and temperature as long as possible inside.

5. The method of claim 1, 3 or 4 which further includes a stop phase of said first gas turbine and generator group (TG1) and first steam generator (GRV1) that comprises, in order, the following sequential operations:

Operation GF2B: reducing the load of said first gas turbine and generator group (TG1) and blocking said steam turbine (TV) and Operation GF1B: stopping said first gas turbine and generator group (TG1)

wherein the method comprises:
verifying completion of said operation GF2B and, subordinate to the completion of operation GF2B automatically effecting operation GF1B,
so that the stop phase of said first gas turbine and generator group (TG1) is automatically carried out.

6. The method of claim 5, wherein said operation GF1B comprises a simultaneous bottling of said first steam generator (GRV1) to keep steam pressure and temperature as long as possible inside.

7. A combined cycle thermal plant to produce energy comprising:
a) a first gas turbine and generator group (TG1),
b) a first recovery steam generator (GRV1) to utilize the latent heat of the exhaust gases of said first gas turbine and generator group (TG1),
c) a steam turbine (TV) with high, medium and low stage pressure in fluid communication with said first steam generator (GRV1) through high, medium and low pressure steam lines;
d) a separate generator kinematically coupled to said steam turbine (TV) to be rotationally operated;
e) a detection and control device to monitor and detect a plurality of parameters that determine correct functioning and/or malfunctioning of said plant, wherein said plant further comprises a control and processing unit that memorizes:
i) each single operation in sequence of sequential operations necessary to obtain the start/stop of each of the components a) to d) of the plant said start/stop defined as starting from off and/or partial or total on conditions and
ii) for each of said operations in sequence of sequential operations, plant conditions to be detected by said detection and control device and associated with the execution of each operation in said sequence of sequential operations,
wherein said control and processing unit is connected to said detection and control device which control and processing unit functions so as to
acquire and process information concerning the functioning and/or malfunctioning status of said plant;
further to a request for a specific start/stop sequence among the memorized start/stop sequences, to automatically start in succession the operations of said sequential operations subordinate to detecting by monitoring of all conditions necessary for said sequential operations to be carried out thus allowing start of each operation of the required sequential operations, by verifying correct achievement of the plant conditions as a consequence of the correct execution of an operation previous to starting the following operation within the same sequential operations, and
wherein said specific start/stop sequence comprises, in order, the following sequential operations:

Operation GF1A: preparing said first gas turbine and generator group (TG1) for start up;

Operation GF2A: starting said first gas turbine and generator group (TG1) and pressurizing said first steam generator (GRV1); and Operation GF3A: warming up and increasing the load of said steam turbine (TV) following starting said first gas turbine and generator group (TG1).

8. The plant of claim 7, further comprising a second gas turbine and generator group (TG2) and a second recovery steam generator (GRV2) to utilize the latent heat of the exhaust gases of said second gas turbine and generator group (TG2);
wherein:
said second steam generator (GRV2) is in fluid communication through a high pressure steam collector (CAP), through a medium pressure steam collector (CMP) and through a low pressure steam collector (CBP) with said high, medium and respectively low pressure steam lines which feed said high, medium and low pressure stages of said steam turbine (TV) to create a steam high, medium and low pressure parallelism between said first steam generator (GRV1) and said second steam generator (GRV2), and
said plant comprises a further detection and control device to detect and monitor a plurality of parameters that determine the correct functioning and/or malfunctioning of said second gas turbine and generator group (TG2) and of said second steam generator (GRV2) and
said control and processing unit is connected to said further detection and control device to acquire and process information concerning the functioning and/or malfunctioning status of said second gas turbine and generator group (TG2) and of said second steam generator (GRV2).

9. The plant of claim 8, wherein said first steam generator (GRV1) and said second steam generator (GRV2) are cylindrical body generators with horizontal development, with three different levels of pressure and a degasification device.

* * * * *